United States Patent [19]
Swanson et al.

[11] 3,824,984
[45] July 23, 1974

[54] CHARCOAL GRILL CONVERSION APPARATUS

[76] Inventors: Marvin C. Swanson, 714 Highwood, Greencastle, Ind. 46135; Harold R. Swanson, 4232 N. Octavia Ave., Norridge, Ill. 60634

[22] Filed: Feb. 10, 1972

[21] Appl. No.: 225,105

[52] U.S. Cl.................. 126/25 R, 239/559, 431/343
[51] Int. Cl........................... A47j 37/07, F24b 3/06
[58] Field of Search........ 126/41 R, 25 R, 25 A, 38, 126/25 B, 39 E; 239/558, 565; 110/1 F

[56] References Cited
UNITED STATES PATENTS

| | | | |
|---|---|---|---|
| 1,163,202 | 12/1915 | Bell | 126/39 E |
| 1,583,373 | 5/1926 | Strong et al. | 126/38 |
| 3,347,220 | 10/1967 | Barbera, Sr. | 126/25 R |
| 3,520,290 | 7/1970 | Winters | 126/25 R |
| 3,552,302 | 1/1971 | Gilberg | 126/25 R X |
| 3,605,653 | 9/1971 | Donnell | 126/25 B |
| 3,608,538 | 9/1971 | Guerrero | 126/38 X |

FOREIGN PATENTS OR APPLICATIONS
244,917  3/1912  Germany ........................... 239/558

*Primary Examiner*—William E. Wayner
*Assistant Examiner*—Harold Joyce
*Attorney, Agent, or Firm*—Cushman, Darby & Cushman

[57] ABSTRACT

A device is disclosed for converting a standard charcoal grill to a gas fired cooking apparatus. The burner comprises a series of rings which have upwardly facing apertures which are disposed concentrically about a central axis of a typical bowl shaped charcoal grill. Rigid members depend from the rings and rest upon the bottom of the grill (to support the burner generally parallel to the open top portion thereof). The rings are connected to a source of gas either through the side or over the side of the grill. In addition, a special grate fabricated from sheet metal for supplying a greater proportion of conductive heat to the food being cooked may be suspended above the grill.

2 Claims, 3 Drawing Figures

PATENTED JUL 23 1974

3,824,984

3,824,984

CHARCOAL GRILL CONVERSION APPARATUS

BACKGROUND OF THE INVENTION

1. Field of the Invention

This invention relates to the field of heating devices and in particular to outdoor cooking devices.

2. Description of the Prior Art

The popularity of outdoor cooking and especially backyard barbecueing is so evident that it really needs no support. While many of types of permanent barbecuing structures are built, perhaps the most popular variety of outdoor cooking apparatus is the portable charcoal grill. Typically, such a grill includes a bowl shaped member in which a supply of charcoal bricketts are placed, an adjustable center post attached to the sides of the bowl shaped member for supporting a light weight metal grill above and parallel to the bowl, legs depending from the bowl portion in a tripod formation and wheels attached to at least two of the legs to allow easy maneuverability. Such grills are known to most suburban and some urban dwellers and their use forms no insignificant portion of American culture. However, the use of charcoal as the oxidizing agent in such grills includes several inherent disadvantages. For example, the bricketts themselves, no matter how carefully processed, are essentially carbon blocks and therefore leave very definite marks on anything or any person which comes in contact with them. Further, the dangers of lighting the charcoal fire by the generally adopted method of charcoal lighter fluid are well known. Of course, it is also well known that charcoal fires generally take between 30 and 45 minutes to mature to the point at which efficient cooking is possible. Also, the problems of cleaning the grills and bowls of conventional charcoal grills are only too well known to their users. Finally, with growing concern over air pollution and tighter air pollution control legislation being enacted the banning or curtailing of outdoor fires is a future likelihood.

The prior art has provided, in the form of a gas burner grill, a cooking apparatus which overcomes most of the above mentioned difficulties. For example, such a grill is more convenient, faster, cleaner and produces much less air pollution. One major problem with the gas grill is that it would require an additional expense of significant proportions to the average home owner over and above what he has already spent on his existing charcoal grill. Another problem with gas grills is that their burner size must be restricted to the area of a single pot or pan since the attempt to heat larger areas by gas results in uneven heating.

Conversion apparatus is also known which can be applied to a conventional charcoal grill to change it to an electric cooking apparatus. Such electric units, however, require a nearby source of electrical power such as an outdoor plug which is not always available at the cooking site. Furthermore, it is very difficult to control the temperature of foods suspended on a grill above the heating elements.

SUMMARY OF THE INVENTION

Thus, it is one object of the applicant's invention to provide a simple and effective conversion apparatus for converting a standard charcoal grill into a gas burner unit. It is a further object to provide such a burner unit having a uniform flame distribution over substantially the entire grill surface. It is a further object of the applicant's invention to provide a special type of grate for a charcoal grill which is capable of holding a significant amount of heat and transferring that heat through the medium of conduction to the food being cooked thereupon.

Essentially, the applicant's apparatus consists of a gas burner comprising a plurality of rings disposed concentrically about the axis of the bowl of a standard charcoal grill and mounted upon rigid members which engage the bottom of the grill. Gas passes through an inlet gas line which either extends through a hole punched in the side of the bowl of the charcoal grill or is disposed in a U-shaped manner over the edge of the grill. This gas line includes a gas valve and flow compensation device for dividing the flow entering the concentric rings to thereby create a uniform flame throughout the rings. In addition, a grate formed from a substantially whole piece of sheet metal which contains a plurality of holes therethrough and which is adapted to be supported by the conventional grill of the charcoal grill, may be supported upon the grill itself.

BRIEF DESCRIPTION OF THE DRAWINGS

The preferred embodiment of the applicant's invention will now be discussed with reference to the drawings in which.

DETAILED DESCRIPTION OF THE PREFERRED EMBODIMENTS

Figure 1:
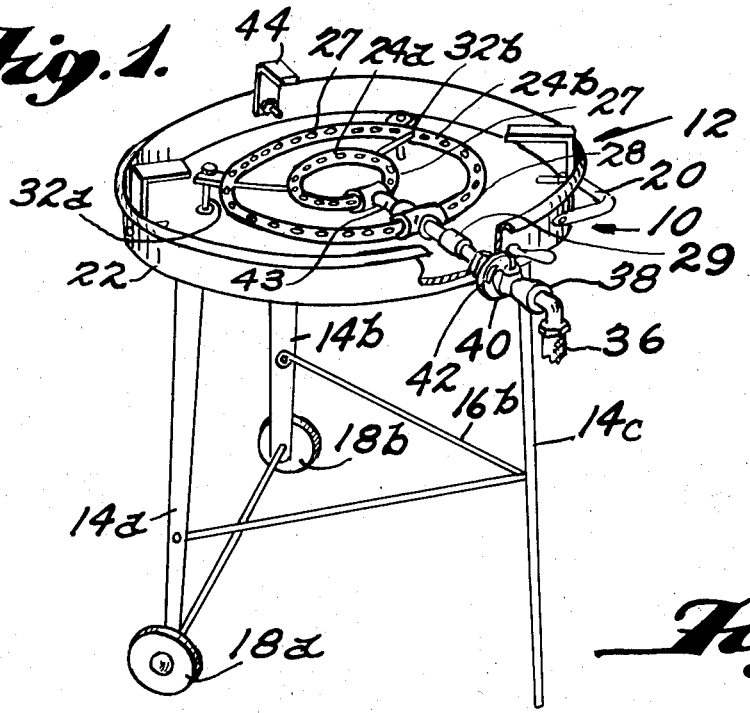
FIG. 1 is a perspective view of a standard charcoal grill 12 (shown without its grate) in which a gas burner according to the applicant's invention has been inserted.

Referring to FIG. 1 reference numeral 10 refers in general to a standard 24 inch charcoal grill. Grill 10 includes a generally bowl shaped portion 12 adapted to receive charcoal bricketts or the like and a tripod arrangement of depending legs 14a, 14b and 14c which are braced together by members 16a and 16b to firmly support bowl section 12. Wheels 18a and 18b are mounted for rotation at the bottom ends of legs 14a and 14b respectively so that grill 10 is easily maneuvered from place to place. Furthermore, a handle 20 is provided on the annular side wall 22 of bowl portion 12 which allows one to easily maneuver the grill.

Within bowl section 12 the plurality of rings 24a and 24b are concentrically disposed about the axis of bowl section 12. These rings contain upwardly facing apertures 27 which are supplied with combustible gases through inlet pipe 28. Pipe 28, in turn, extends through the aperture 30 which has been punched or otherwise formed in annular side wall 22. Thus, side wall 22 forms one point of support for the rings 24a and 24b. Other points of support are provided by legs 32a and 32b which depend from the outer ring 24a to engage the bottom of bowl section 12 to support the rings in a generally horizontal manner.

That portion of inlet conduit 28 which extends through aperture 30 is connected to a gas line 36 through a conventional gas valve 38 and a conventional air gas mixer 40. Gas valve 38 controls the amount of fuel fed to the rings while a sliding door 42 controls the air-gas mixture fed to the rings. The flow restricting orifice 43 restricts the flow of this gas-air mixture to inner ring 24a with respect to outer ring 24b whereby a uniform flame may be produced at both rings. In short, a system is provided for supplying a controlled flame which is easy to start and easy to control as to temperature in contrast to the heat supplied by a charcoal fire.

The gas line 36 may be connected to a household source of gas such as is used in a gas range or it may be connected to a bottle of gas under pressure (not shown) which may be mounted to standard grill 10 for movement therewith. In this manner the grill 10 could easily be used as safe and non-polluting camp cooking apparatus. Also shown in FIG. 1 are a plurality of brackets 44 for supporting the grate of the charcoal grill 10. The grate may also be supported by a center post in a manner known to the charcoal grill art. In addition, the slip joint 29 in inlet conduit 28 which is also shown in FIG. 1 allows the entire burner unit to be removed from bowl section 12 for cleaning each portion.

Figure 2:
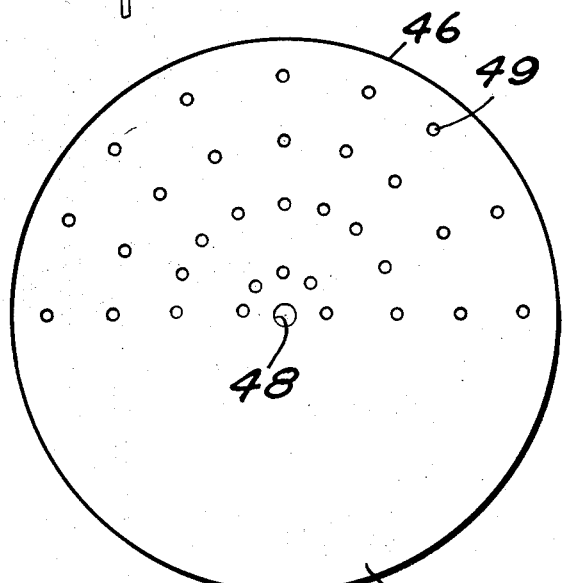
FIG. 2 is a top view of a special grate in accordance with the applicant's invention.

Turning to FIG. 2 the applicant's specially constructed grate 46 will now be described. In contradistinction to ordinary charcoal grill grates which are fabricated from wire, grate 46 comprises a generally continuous sheet of metallic or other highly heat conductive material. Thus grate 46 both spreads the heat applied thereto by the burners, and, in addition, it applies more efficient conductive heat to the foods placed thereupon. Grate 46 contains an axial aperture 48 for receiving a spindle when necessary and a plurality of smaller apertures 49 which allow greases exuded by cooking foods to be continually withdrawn from the cooking surface. The portion 50 of grate 46 contains no apertures and may be effectively used to heat pots or pans placed thereupon which do not require drainage. Grate 46 is preferably sized and shaped to cover the same area covered by conventional grates.

Figure 3:
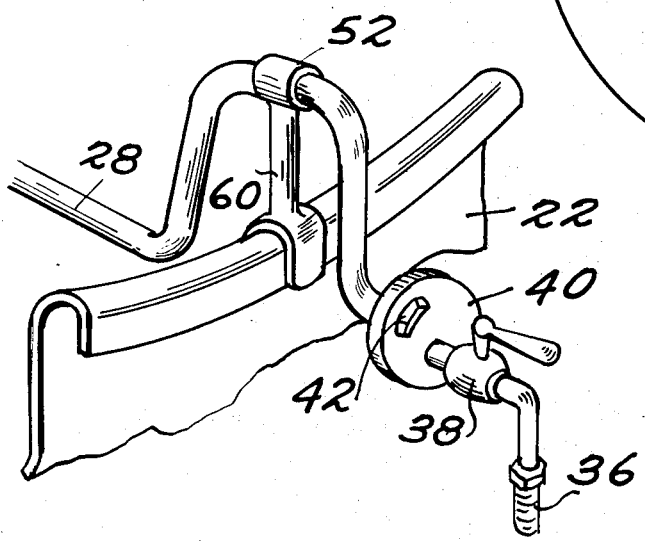
FIG. 3 is a detailed view showing a second embodiment of the applicant's invention.

Turning to FIG. 3, a second embodiment of the applicant's invention is shown. This embodiment is identical to that shown in FIG. 1 with the exception of the support means shown for the conduit 28, gas valve 38 and air-gas mixer 40. As can be seen, the support means of the second embodiment comprises a clamp 52 which surrounds conduit 28 and to which is attached the U-shaped bracket 60 which is adapted to rest upon the upper edge of annular side wall 22.

While the above description fully covers the preferred embodiment of the applicant's invention, many modifications may be made thereto with the scope of the invention. Thus, for example, the above described legs 32a and 32b and the U-shaped bracket 60 which, together in the second embodiment, support concentric rings 24a and 24b, may all be made adjustable though such adjustment is usually not necessary due to the flame control possible with gas valve 38.

What is claimed is:

1. In combination with a burning cooking grill having a bowl-shaped configuration, the improvement comprising a conversion assembly including:
   a gas burner having a plurality of communicating concentric rings with apertures therein for the passage therethrough of an air-gas mixture, said gas burner having a plurality of support legs for quickly and easily mounting the gas burner in spaced relationship from the bottom of the bowl-shaped charcoal grill;
   flow restricting means positioned between the communicating concentric rings so as to restrict the air-gas mixture thereby producing a uniform flame distribution from the concentric rings;
   a conduit having one end connected to and another end extending from the gas burner;
   regulation means for supplying gas to the burner and regulating the admixture of air to the gas;
   coupling means for detachably coupling the regulation means to the conduit so as to facilitate a quick connection and disconnection therebetween; and
   support means having a generally U-shaped portion contacting an upper edge of the grill so as to insure that the conduit is raised over the upper edge of the bowl-shaped configuration.

2. A conversion assembly as in claim 1 including a grate placed over the gas burner and having a first portion formed with a plurality of apertures and a second portion formed essentially without apertures.

* * * * *